(12) United States Patent
Leeman et al.

(10) Patent No.: US 10,067,727 B2
(45) Date of Patent: Sep. 4, 2018

(54) AUTOMATED MEASUREMENT OF DIFFERENTIAL LATENCY BETWEEN DISPLAYS

(71) Applicant: Barco N.V., Kortrijk (BE)

(72) Inventors: Marc Leeman, Waregem (BE); Patrick C. Candry, Harelbeke (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 14/653,894

(22) PCT Filed: Dec. 21, 2012

(86) PCT No.: PCT/BE2012/000055
§ 371 (c)(1),
(2) Date: Jun. 19, 2015

(87) PCT Pub. No.: WO2014/094077
PCT Pub. Date: Jun. 26, 2014

(65) Prior Publication Data
US 2015/0317926 A1    Nov. 5, 2015

(51) Int. Cl.
*G06F 3/14* (2006.01)
*G09G 3/00* (2006.01)
(Continued)

(52) U.S. Cl.
CPC .......... *G06F 3/1446* (2013.01); *G06F 3/1431* (2013.01); *G09G 3/006* (2013.01);
(Continued)

(58) Field of Classification Search
None
See application file for complete search history.

(56) References Cited

U.S. PATENT DOCUMENTS

| 4,540,982 A | 9/1985 | Jalovec |
| 5,051,991 A | 9/1991 | Szczutkowski |

(Continued)

FOREIGN PATENT DOCUMENTS

| JP | 2005 184749 | 7/2005 |
| JP | 2005 184749 A | 7/2005 |

(Continued)

OTHER PUBLICATIONS

International Search Report and Written Opinion for corresponding Patent Application No. PCT/BE2012/000055 dated Jul. 31, 2013.

(Continued)

*Primary Examiner* — Hilina K Demeter
(74) *Attorney, Agent, or Firm* — Renner, Otto, Boisselle & Sklar, LLP

(57) ABSTRACT

The present invention relates to methods or system for the measurement of differential latency between displays located at endpoints of network, displays being driven by one or more rendering machines and having means for refreshing the images on different displays at the same point in time as well as means adapted so that the content of each displayed image can only change after the completion of previous displayed frame. For example the displays can be frame locked and have double buffered swap locked memory operation. The method or system is adapted to stream test images over the network to the displays of the different endpoints. The test images are displayed on the displays. The displayed images at the different endpoints with an image recording device such as a camera. Optionally the delays can be compensated, e.g. by delaying the streams with lower latency at the level of the frame buffer (FIFO) before or after decoding. Preferably the system or method is adapted to measure end-to-end differential latency between the displays and for putting this in vector form.

17 Claims, 12 Drawing Sheets

(51) Int. Cl.
*H04N 17/04* (2006.01)
*G09G 5/39* (2006.01)
(52) U.S. Cl.
CPC .............. *H04N 17/04* (2013.01); *G09G 5/39* (2013.01); *G09G 2320/0693* (2013.01); *G09G 2340/02* (2013.01); *G09G 2360/08* (2013.01)

(56) References Cited

U.S. PATENT DOCUMENTS

| | | | |
|---|---|---|---|
| 6,804,406 | B1 | 10/2004 | Chen |
| 7,124,319 | B2 | 10/2006 | Watkins et al. |
| 2002/0118201 | A1* | 8/2002 | Mukherjee ............ G06F 3/1438 345/504 |
| 2003/0067587 | A1 | 4/2003 | Yamasaki et al. |
| 2005/0174482 | A1 | 8/2005 | Yamada et al. |
| 2006/0139490 | A1* | 6/2006 | Fekkes ................ H04N 5/04 348/515 |
| 2006/0192782 | A1* | 8/2006 | Hildreth ............... A63F 13/00 345/473 |
| 2007/0247470 | A1* | 10/2007 | Dhuey ................ G09G 5/006 345/545 |
| 2009/0002379 | A1* | 1/2009 | Baeza .................. G06T 1/20 345/522 |
| 2012/0017233 | A1* | 1/2012 | Kudelski .......... G11B 20/00086 725/25 |
| 2012/0287288 | A1* | 11/2012 | Steinberg ............. H04N 17/04 348/181 |
| 2014/0085459 | A1* | 3/2014 | Blanton ................ H04N 17/04 348/135 |

FOREIGN PATENT DOCUMENTS

| | | |
|---|---|---|
| WO | 00/18139 | 3/2000 |
| WO | 00/18139 A1 | 3/2000 |

OTHER PUBLICATIONS

Written Opinion for corresponding Patent Application No. PCT/BE2012/000055 dated Dec. 3, 2014.
International Preliminary Report on Patentability for corresponding Patent Application No. PCT/BE2012/000055 dated Mar. 5, 2015.
Sungwon Nam et al., "Multiapplication, Intertile Synchronization on Ultra-High-Resolution Display Walls", Feb. 22, 2010, pp. 145-156.
Corresponding European Communication Pursuant to Article 94(3), dated Aug. 19, 2016, for European Application No. 12 830 866.5.
Sungwon Nam et al., Multiapplication, Intertile Synchronization on Ultra-High Resolution Display WallsxGOJu, MMSYS'10, ACM, US, Feb. 22, 2010 (Feb. 22, 2010), pp. 145-156, XP007922020, IBSN 978-1-60558-914-5.
Office Action in corresponding Chinese Application No. 201280077943.3 dated Feb. 23, 2017 and English Translation.
Office Action for corresponding Chinese Application No. 201280077943.3 dated Aug. 14, 2017 and English Translation.

* cited by examiner

AUTOMATED MEASUREMENT OF DIFFERENTIAL LATENCY BETWEEN DISPLAYS

This application is a national phase of International Application No. PCT/BE2012/000055 filed Dec. 21, 2012 and published in the English language, which is hereby incorporated herein by reference.

The present invention relates to a method or system or system components for compensation and/or measurement of differential latency between displays located at endpoints of network as well as software for carrying out any of the methods and signal storage media for storing the software.

TECHNICAL BACKGROUND

Different rendering machines and displays at the endpoints of IP networks can show different end-to-end latencies.

A typical chain consists of the following components:
(1) Source
(2) Encoder
(3) Network
(4) Decoder
(5) Renderer
(6) Display Each hardware and/or software component in such a chain can in general have different processing time periods (processing latency) and these processing time periods can vary over time. Also the applied hardware and/or software solutions are evolving over time, and consequently the processing time periods can change. Also the network has in general a different delay to the different endpoints, and also this delay can vary over time (network latency).

Solutions for re-synchronizing data streams from the source to the destination are possible, for example as disclosed in RFC 3550, as long as the data can be controlled within a data processing framework and with high precision (e.g. <150 ms).

Typically, the last synchronization point can be either just after the decoding (in the case of a software decoder) or just before the decoding (in the case of a hardware decoder). As such, the decoding, rendering and displaying add an unknown amount of latency that in general can be different between the different endpoints. This latency can in general be different for the various endpoints because the latency depends on the specific hardware and/or software implementations. Moreover this latency can vary over time for each endpoint.

Many applications require that the displayed images at the different endpoints are "data-synchronized" i.e. the displays must display the same frame at the same point in time. It is therefore important that the different end-to-end latencies can be measured in an easy way and compensated accordingly. Such a recalibration is necessary on a regular basis because the end-to-end latency for the various endpoints can change over time.

In U.S. Pat. No. 4,540,982 the delay compensation is realized in hardware with flip-flops and AND-gates to implement multi-vibrator circuits. In essence a differential clock generator i.e. two clock trains, of the same frequency is implemented, that can be relative phase shifted. The two shifted clocks are used to compensate for all kinds of delays in electronic circuits.

In US 2007/0247470 A1 a solution is described to reduce the latency of a display device. A controller controls the transfer of pixels from a frame buffer to the display module. The controller monitors the content of the frame memory. A minimum number of pixels must be available in the buffer memory before the transfer to the display module starts. This minimum number of pixels depends on the image format (e.g. number of lines and the refresh rate). In this solution the controller is not waiting till a full frame is available in the frame memory but starts to transfer the pixels from the frame memory earlier to reduce the latency caused by the display device.

SUMMARY OF THE INVENTION

An aspect of the present invention is a method for measuring the end-to-end differential latency between displays and for putting this in vector form to perform differential compensation. The vectors are used to steer dequeue operations.

The present invention relates in one aspect to a method of measurement of differential latency between displays located at endpoints of network, displays being driven by one or more rendering machines and having means for refreshing the images on different displays at the same point in time as well as means adapted so that the content of each displayed image can only change after the completion of previous displayed frame, for example the displays being frame locked and having double buffered swap locked memory operation, the method comprising:

Streaming test images over the network to the displays of the different endpoints, measuring end-to-end differential latency between the displays and for putting this in vector form.

The vectors are preferably used to perform differential compensation of the delays at the displays.

For example, the vectors are sent to the displays e.g. to the frame buffers, to steer dequeue operations. The frame buffers can be FIFO's for example.

The method may include the steps of displaying the test images on the displays and capturing the displayed images at the different endpoints with an image recording device.

The image recording device can be a camera for example.

There is no requirement for the camera to be synchronized with the displays.

In accordance with an embodiment of the present invention a measurement algorithm is carried out followed by delay compensation.

The present invention also provides a display unit for measurement of differential latency between displays located at endpoints of network, the display unit comprising:
displays being driven by one or more rendering machines and having means for refreshing the images on different displays at the same point in time,
means adapted so that the content of each displayed image can only change after the completion of previous displayed frame,
means for receiving streaming test images from the network and supplying these images to the displays of the different endpoints, and
measuring end-to-end differential latency between the displays and for putting this in vector form.

The unit may be adapted to perform differential compensation of the delays at the displays using the vectors.

For example, the unit may be adapted to send vectors to the displays e.g. to the frame buffers. The displays may be adapted to steer dequeue operations using the vectors. The frame buffers can be FIFO's for example.

The unit may include means for capturing displayed images at the different endpoints with an image recording device.

The image recording device can be a camera for example.

There is no requirement for the camera to be synchronized with the displays.

In accordance with an embodiment of the present invention, the unit is adapted to perform a measurement algorithm followed by optional delay compensation.

In one aspect the present invention provides compensation of frame latency differences between two or more networked displays. Embodiments of the present invention include means for measuring the differential latencies and for compensating by delaying the streams with lower latency. The compensation may be performed by delaying the streams with lower latency at the level of the frame buffer (FIFO) before or after decoding.

Accordingly an aspect of the present invention is that the unit is adapted to measure a differential latency between displays and for putting this in vector form to perform differential compensation. The vectors are used to steer dequeue operations. For example, the vectors are sent to the displays e.g. to the frame buffers, to steer dequeue operations. The frame buffers can be FIFO's for example.

In a further aspect a system of measurement of differential latency between displays located at endpoints of network is provided, displays being driven by one or more rendering machines and having means for refreshing the images on different displays at the same point in time as well as means adapted so that the content of each displayed image can only change after the completion of previous displayed frame, the system comprising:
means for streaming test images over the network to the displays of the different endpoints, and
means for measuring end-to-end differential latency between the displays and for putting this in vector form.

The system may be adapted to perform differential compensation of the delays at the displays using the vectors.

For example, the system may be adapted to send vectors to the displays e.g. to the frame buffers. The displays may be adapted to steer dequeue operations using the vectors. The frame buffers can be FIFO's for example.

The system may include means for capturing displayed images at the different endpoints with an image recording device.

The image recording device can be a camera for example.

There is no requirement for the camera to be synchronized with the displays.

In accordance with an embodiment of the present invention, the system can be adapted to perform a measurement algorithm followed by optional delay compensation.

The present invention relates in a further aspect to a method of measurement of differential latency between displays located at endpoints of network, displays being driven by one or more rendering machines and having means for refreshing the images on different displays at the same point in time as well as means adapted so that the content of each displayed image can only change after the completion of previous displayed frame, for example the displays being frame locked and having double buffered swap locked memory operation, the method comprising:
Streaming test images over the network to the displays of the different endpoints.
displaying the test images on the displays and
capturing the displayed images at the different endpoints with an image recording device.

The image recording device can be a camera for example.

There is no requirement for the camera to be synchronized with the displays.

In accordance with an embodiment of the present invention a measurement algorithm is carried out followed by optional delay compensation.

An aspect of the present invention is a method for measuring the end-to-end differential latency between displays and for putting this in vector form to perform differential compensation. The vectors are used to steer dequeue operations. For example, the vectors are sent to the displays e.g. to the frame buffers, to steer dequeue operations. The frame buffers can be FIFO's for example.

The present invention also provides a display unit for measurement of differential latency between displays located at endpoints of network, the display unit comprising:
displays being driven by one or more rendering machines and having means for refreshing the images on different displays at the same point in time,
means adapted so that the content of each displayed image can only change after the completion of previous displayed frame,
means for receiving streaming test images from the network and supplying these images to the displays of the different endpoints, and
means for capturing displayed images at the different endpoints with an image recording device.

The image recording device can be a camera for example.

There is no requirement for the camera to be synchronized with the displays.

In accordance with an embodiment of the present invention, the unit is adapted to perform a measurement algorithm followed by optional delay compensation.

In one aspect the present invention provides compensation of frame latency differences between two or more networked displays. Embodiments of the present invention include means for measuring the differential latencies and for compensating by delaying the streams with lower latency. The compensation may be performed by delaying the streams with lower latency at the level of the frame buffer (FIFO) before or after decoding. Accordingly an aspect of the present invention is that the unit is adapted to measure a differential latency between displays and for putting this in vector form to perform differential compensation. The vectors are used to steer dequeue operations. For example, the vectors are sent to the displays e.g. to the frame buffers, to steer dequeue operations. The frame buffers can be FIFO's for example.

In a further aspect a system of measurement of differential latency between displays located at endpoints of network is provided, displays being driven by one or more rendering machines and having means for refreshing the images on different displays at the same point in time as well as means adapted so that the content of each displayed image can only change after the completion of previous displayed frame, the system comprising:
means for streaming test images over the network to the displays of the different endpoints, and
means for capturing displayed images at the different endpoints with an image recording device.

DETAILED DESCRIPTION OF THE ILLUSTRATIVE EMBODIMENTS

Aspects of the present invention relate to a network with displays whereby different rendering machines and displays at the endpoints of networks can show different end-to-end latencies.

A typical chain consists of the following components:
(1) Data source
(2) Encoder
(3) Network
(4) Decoder
(5) Renderer
(6) Display The present invention in its various embodiments comprises methods and/or systems adapted to stream images such as specific test images over a network to displays at different endpoints. Preferably all the displays are driven by rendering machines. Preferably means for refreshing the images on different displays at the same point in time and means adapted so that the content of each displayed image can only change after the completion of previous displayed frame are provided. For example, the rendering machines are preferably frame locked and have double buffered swap locked memory operation. These features are important for data-synchronization. The images of the displays at the different endpoints are captured by an image recording device of which a camera is one possibility. The camera need not be/is not synchronized with the displays. A measurement algorithm is performed and a delay compensation can be performed.

Tiled Display Configurations and Rendering Machines

Figure 1:
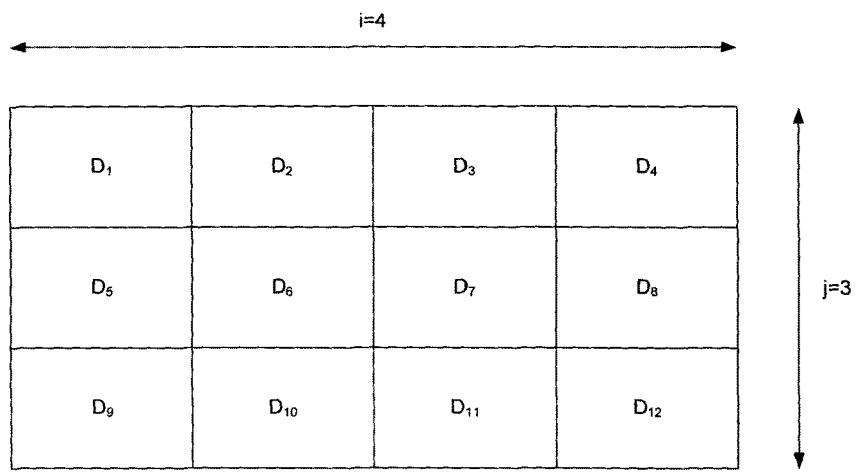
FIG. 1 shows an example of tiled display configuration of 4×3 displays that can be used with any of the embodiments of the present invention.
Figure 2:
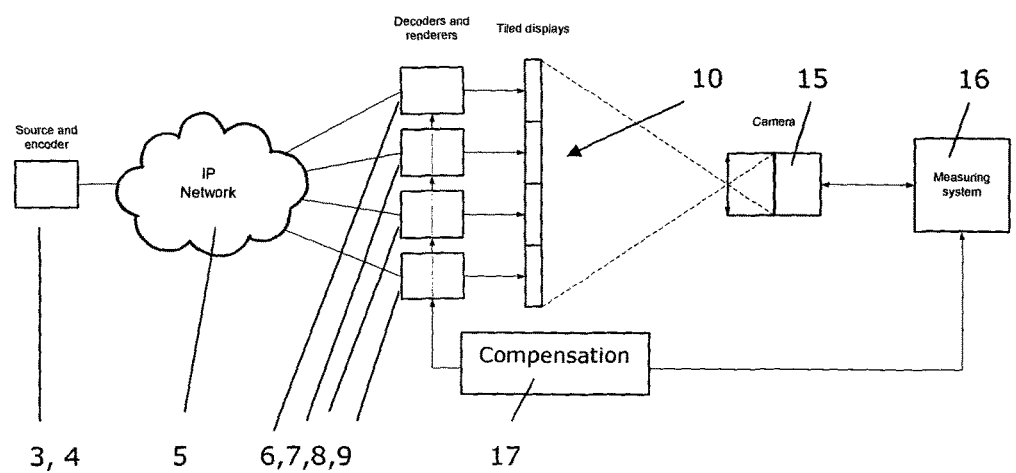
FIG. 2 shows an embodiment of the present invention wherein images are streamed to a displays wall, images are captured and a measuring system is provided with feedback to the renderers for latency compensation.

A plurality of displays ($D_1$, $D_2$, ..., $D_I$—see FIGS. 1 and 2), for example projectors and screens such as rear projection displays, fixed format displays, CRT, LED, plasma, LCD, OLED displays or similar are arranged for example in a matrix structure of i by j displays to form a high resolution display wall (FIG. 1, 10 in FIG. 2). The image display 10 is driven by one or more decoders and rendering machines 6-9. One rendering machine can drive one or more displays $D_i$ of the display wall 10. Data from a data source 3 such as a video source S is streamed e.g. via an encoder 4, in a compressed, encrypted or raw format, over a network 5 such as a data network, large area network, local area network, wireless network including RF or optical such as IR network, or wired network, especially over an IP network to the rendering machines 6-9 and displayed on the high resolution display wall 10. A tiled display wall is an example. Any configuration of displays, tiled or not can be used with embodiments of the present invention. The insertion area of the video source will in general be spread over several displays $D_1$, $D_2$, ..., $D_I$, forming one logical video insertion. Due to different network latencies and/or processing latencies or other latencies the images on one or more of the displays $D_1$, $D_2$, ..., $D_I$ can appear with different time shifts. In other words, image frames that were generated or captured at the same point in time can, due to the different network and processing latencies, appear on the displays of the display wall with different time delays.

In embodiments of the present invention means for refreshing the images on different displays at the same point in time and means adapted so that the content of each displayed image can only change after the completion of previous displayed frame is provided. For example, in an aspect of the present invention the decoders and rendering machines 6-9 are preferably frame locked, i.e. there is a means for frame locking. This means that synchronization signals such as vertical synchronization signals Vsync of all the relevant rendering machines and the displays of a group of displays e.g. of the display wall 10 have exactly the same frequency and phase. For example, one implementation system or method that can be used with any embodiment of the present invention is adapted to configure one rendering machine as master delivering the synchronization signals such as Vsync to each of the other rendering machines. Another system or method which can be used with any embodiment of the present invention is adapted to lock every rendering machine to an external synchronization signal such as Vsync supplied by an external synchronization signal generator. This latter implementation is called genlock. The rendering machines preferably have double buffered and swap locked memory operation. These features, e.g. vertical synchronization and double buffered memory operation with swap locking guarantees that the images on the different displays are refreshed at the same point in time and that the content of each displayed image can only change after the completion of previous displayed frame, i.e. can provide the means for refreshing the images on different displays at the same point in time and means adapted so that the content of each displayed image can only change after the completion of previous displayed frame. It is however still possible that frames, from the source S, captured or generated at the same point in time are shown with different time delays on the screens, but the different time delays will be an integer multiple of the display's vertical time period. Thus although vertical synchronization and double buffered memory operation with swap locking are prerequisites for the data-synchronization they do not guarantee it alone.

Figure 3:
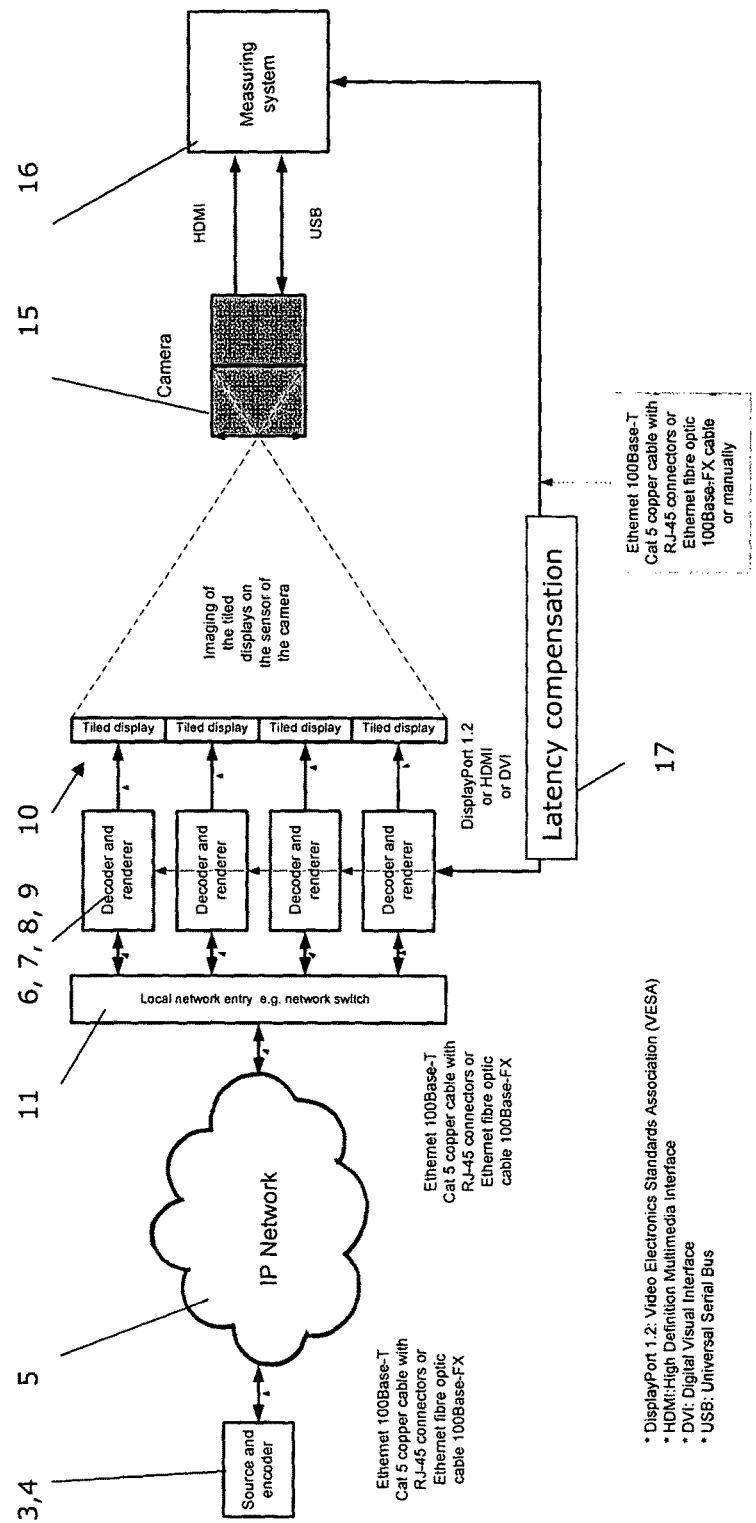
FIG. 3 shows a more detailed embodiment of the present invention with a network and display and camera interfaces.

In accordance with embodiments of the present invention a method and/or a system and/or system components including software are provided as network interfaces 11 (FIG. 3), and to measure (e.g. camera 15 and measuring system 16) the different end-to-end time delays between streamed, processed and displayed image frames on the display wall 10. Once the end-to-end time delays are measured, embodiments of the present invention provide a method and/or a system and/or system components including software to compensate (latency compensation 17—shown schematically) for the differences of the time delays. Consequently data-synchronization can be guaranteed. A more detailed version of FIG. 2 is shown in FIG. 3 for Ethernet 100 base IP networks.

Test Pattern

In accordance with embodiments of the present invention a pattern such as a test pattern is streamed from the source S to the displays at the endpoints, e.g. a display wall. The test pattern should be designed to all the determination of delays. To determine delays the test pattern should ideally have a portion of the image which is the same for each display when it is rendered. The test pattern can be, for example a full white field with time duration of m vertical display periods. This full white field tests pattern is rendered on each of the displays. The display's frame rate (vertical synchronization frequency) is denoted $f_d$, the vertical display time period is therefore $$T_d = \frac{1}{f_d}$$

and the time duration of the test pattern is therefore m $T_d$.

Figure 4:
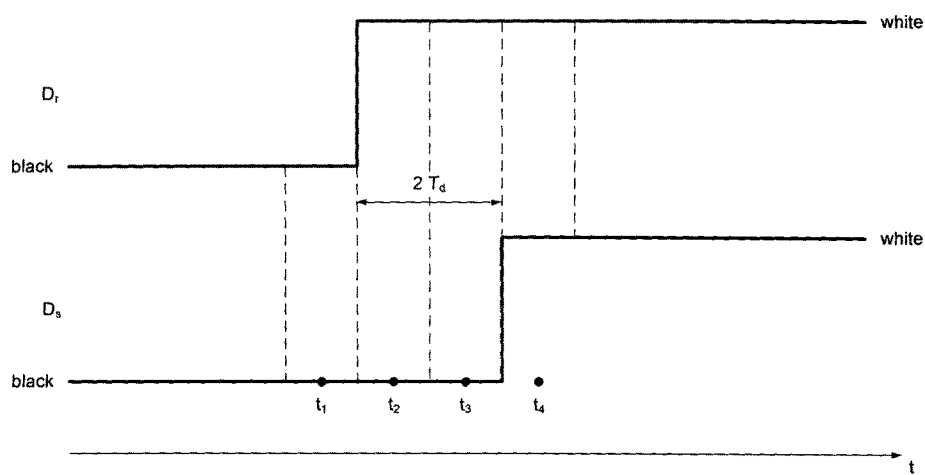
FIG. 4 illustrates a latency difference example of 2 $T_d$ between display $D_r$ and $D_s$.
Figure 5:
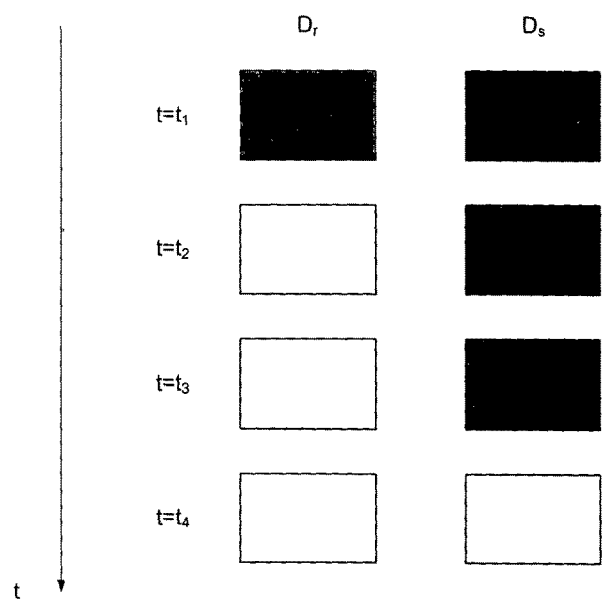
FIG. 5 illustrates the images when there is a latency difference of 2 $T_d$ between display $D_r$ and $D_s$.

In FIG. 4 and FIG. 5, FIG. 4 illustrates a latency difference example of 2 Td between display Dr and Ds. FIG. 5 shows the related images. At $t=t_1$ both $D_r$ and $D_s$ are black. At $t=t_2$ and $t=t_3$ the streamed full white field is white on display $D_r$ and still black on display $D_s$. At $t=t_4$ both $D_r$ and $D_s$ show a white image.

Image Recording Device

In embodiments of the present invention an optical recoding means such as a camera is used as part of the measuring system. This device preferably captures the complete image presented by the plurality of individual displays, e.g. by the complete display wall, at a rate of $$f_c = \frac{1}{T_c}$$

frames per second. The capture can be optically as done with a camera which images the complete wall 10 or the data may be read out from each display electronically and combined into a electronic version of a camera image, e.g. a canvas. The processing of the date whether it is captured electronically or by a camera which converts optical signals into digital signals is basically the same so that in the following only the camera will be described. It should be understood however that other means such as electronic capture can be used equally well. An electronic capture device can operate in the same way as a camera, e.g. with an integration time and a vertical time period. Optionally the camera can operate asynchronously with respect to the displays. Henceforth only the description of a camera will be made for simplicity. The integration time, also called electronic shutter time, of the camera is denoted $T_{int}$. The camera's vertical time period is denoted $T_c$.

The following conditions must be fulfilled:

$$T_{int} \ll T_c \quad (1)$$

$$T_c < T_d \quad (2)$$

The display system can communicate it's frame rate $f_d$ to the measurement system, therefore the measurement system can always adjust its capturing rate $f_c$ to fulfill the condition $T_c < T_d$. It is assumed that the differential latency is n $T_d$ with n=0, 1, 2, 3, . . . p. The duration of the white field test pattern m $T_d$ is chosen such that p $T_d <$ m $T_d$.

Figure 6:
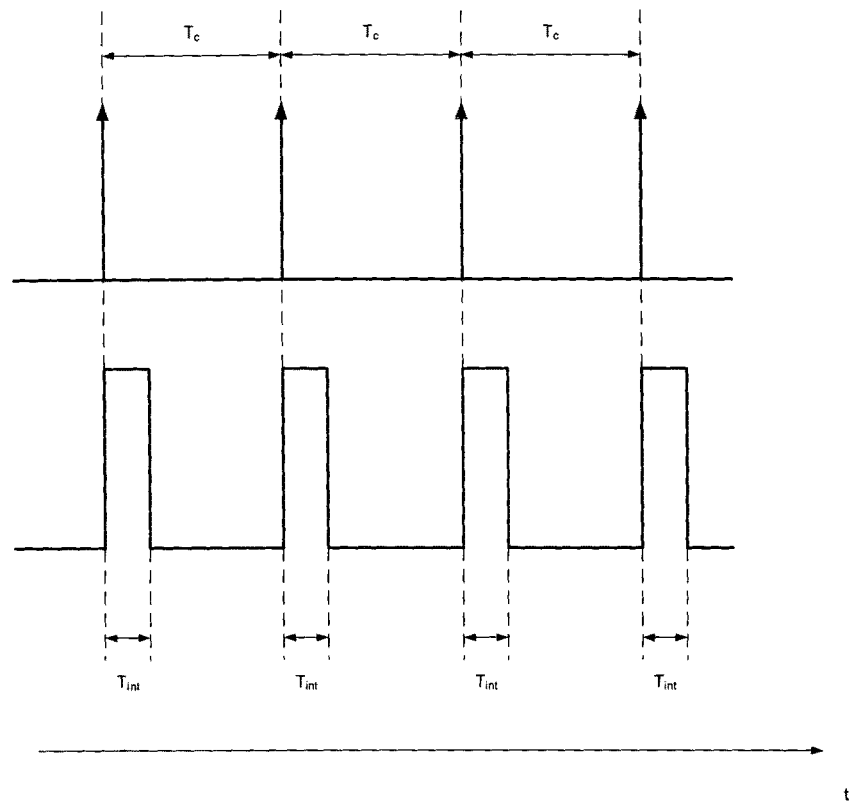
FIG. 6 shows vertical arrows are corresponding with the start of the camera's integration period as used in embodiments of the present invention.

In the time diagrams shown in FIGS. 6 and 8 to 11, the vertical arrow corresponds with the start of the camera's integration period (see FIG. 6).

Figure 7:
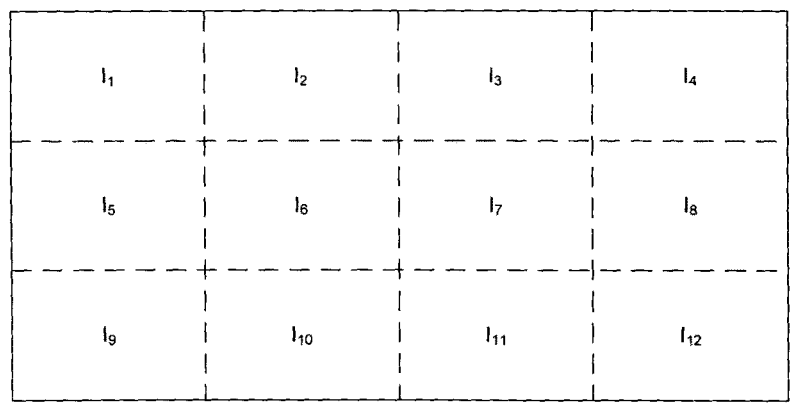
FIG. 7 shows camera image of the example of the tiled 4 by 3 displays.

The image of the display wall is imaged in the camera's imaging system, e.g. on the camera's sensor. Each tile of the display wall is therefore imaged on adjacent areas $i_1 \ldots i_{12}$ of the camera's imaging system, e.g. on adjacent areas of the camera's sensor (FIG. 7).

Differential End-to-end Latency $T_{\Delta L}$ Measurement

It has already been explained that the differential end-to-end latencies, denoted $T_{\Delta L}$, are an integer multiple of the display's vertical time period:

$$T_{\Delta L} = n\ T_d \text{ with } n=0,1,2,\ldots p \text{ and } p<m$$

Figure 8:
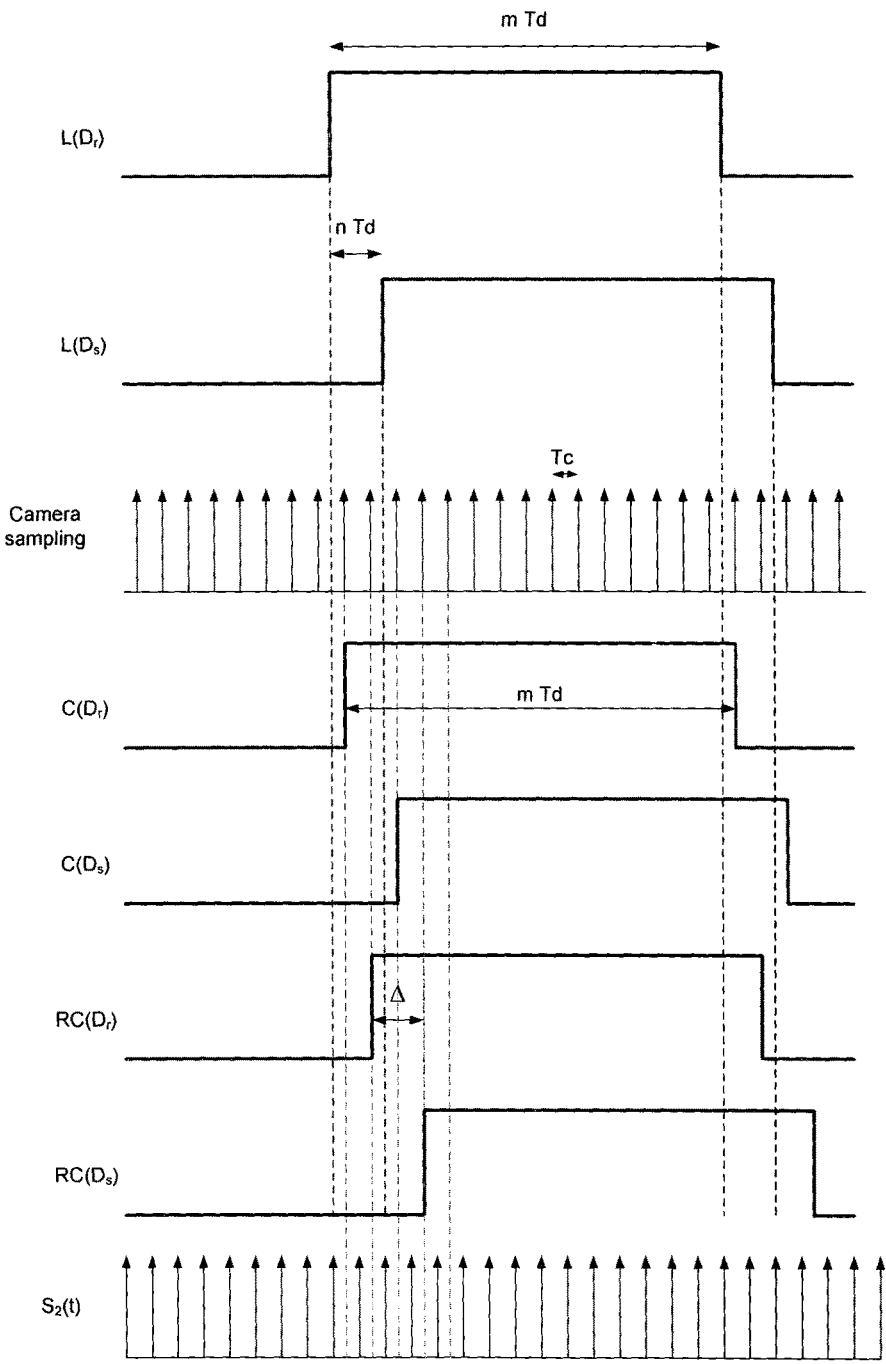
FIG. 8 shows a delay of n $T_d$ between displays $D_r$ and $D_s$.

Consider now a delay of n $T_d$ between displays $D_r$ and $D_s$ (FIG. 8). The display luminance in the center of the screen of displays $D_r$ and $D_s$ is respectively $L(D_r)$ and $L(D_s)$. The integration time (also called the electronic shutter time) of the camera is set at for example $$\frac{T_c}{20}.$$

The camera is preferably adapted so that the camera response has only two stable states or in other words has a binary output. Such a camera produces a binary image. One way of doing this is as follows. The images of $D_r$ and $D_s$ are sampled by the camera. $L(D_r)$ and $L(D_s)$ are causing a an image related change in the camera, e.g. a charge build-up $C(D_r)$ and $C(D_s)$ in certain locations of the camera, for example in the CCD sensor or CMOS sensor of the camera $C(D_r)$ and $C(D_s)$. Consider now the response of the camera in the center of the images of $D_r$ and $D_s$, this is respectively $RC(D_r)$ and $RC(D_s)$. The camera settings are adjusted in such a way that the camera responses reach the saturation level within the integration time $T_{int}$. If this is not possible then a Schmitt trigger circuit can be added. We have therefore a camera response that has only two stable states or in other words a binary output. These camera responses are available at the output of the camera at the beginning of the next camera frame. The camera responses show in this case a time difference A, the measured time difference is not necessarily equal to n $T_d$, but this is not a problem. For example the system can be adapted so that the end-to-end differential latency is adjusted until the time difference will be eliminated. It is guaranteed that if n $T_d \neq 0$ then $\Delta \neq 0$, and that if n $T_d = 0$ then $\Delta = 0$.

The time resolution of the sampling depends on the sampling frequency of the camera $$f_c = \frac{1}{T_c}$$

and the width or me sampling pulse $T_{int}$. The critical situation happens at n=1. In this situation it is necessary that at least one sampling pulse is situated in the time period $T_d$, therefore the condition $T_c < T_d$ must be fulfilled.

Figure 9:
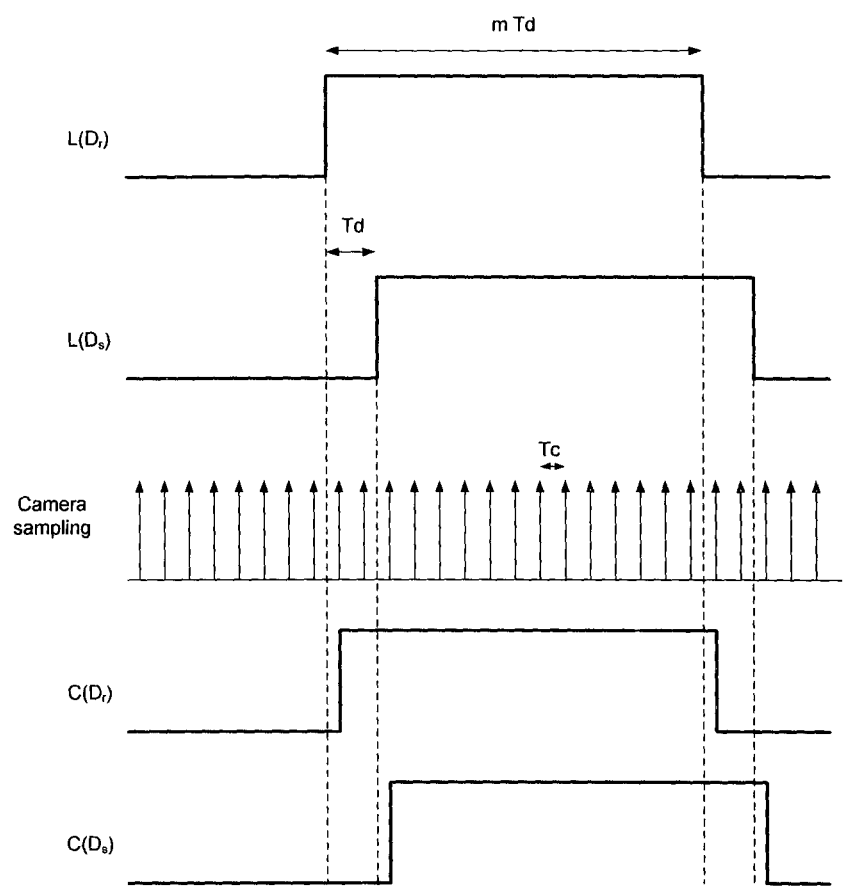
FIG. 9 shows the situation for the case when $T_c<T_d$.

FIG. 9 shows the situation for the case when $T_c < T_d$.

Figure 10:
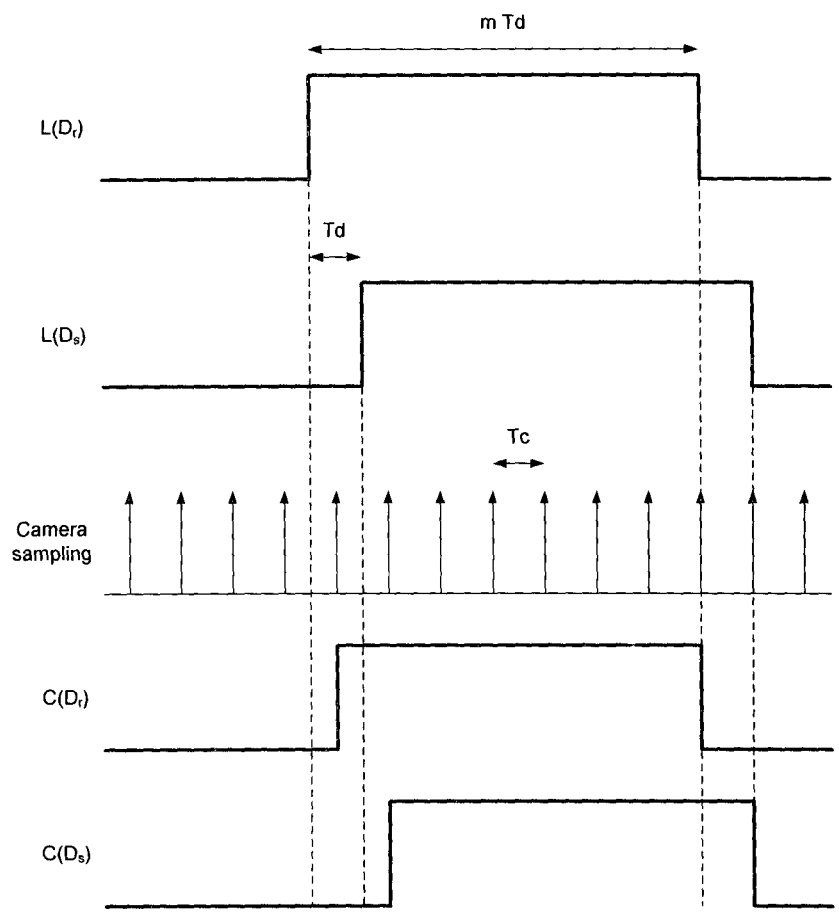
FIG. 10 shows the case when $T_c=T_d$.
Figure 11:
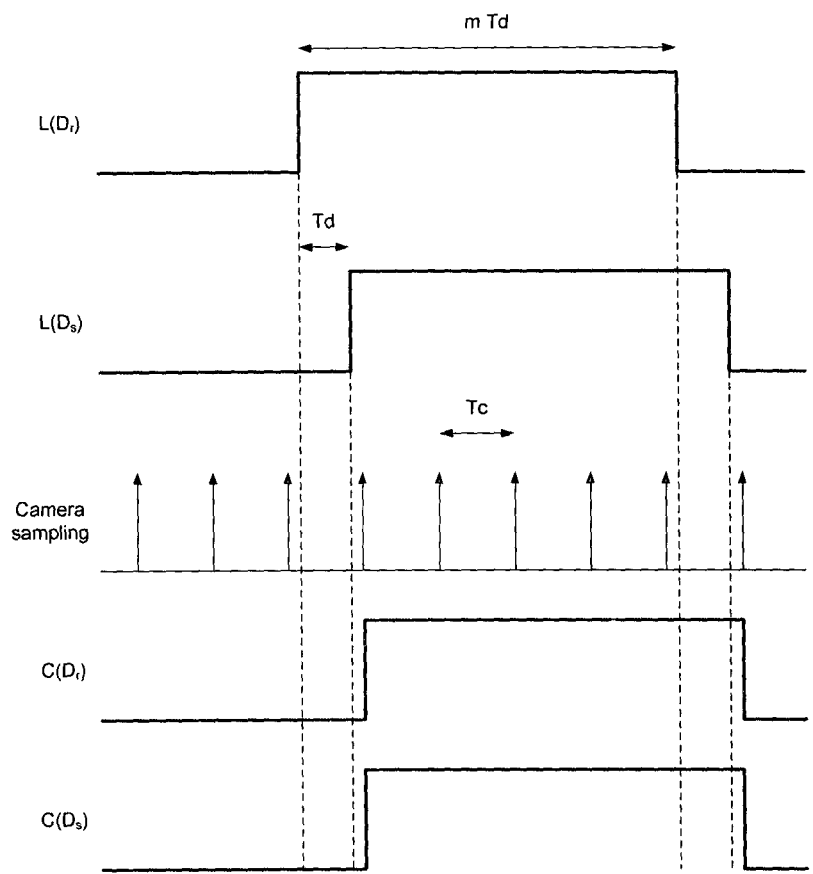
FIG. 11 shows the case when $T_c>T_d$, i.e. a too low time resolution.

FIG. 10 shows the case $T_c = T_d$ and FIG. 11 shows the case for $T_c < T_d$.

In embodiments of the present invention means is provided for measurement of the relative time delays between the responses $RC(D_i)$ with i=1, 2, ..., n that starts with the simultaneous sampling of the signals $RC(D_i)$ by a sampling signal $S_2(t)$ with the following properties:

(1) $S_2(t)$ has exactly the same frequency as the camera sampling signal (2) $S_2(t)$ is synchronous with the camera sampling signal (3) $S_2(t)$ is delayed over a time $$\frac{T_c}{2}$$

with respect to the camera sampling signal

This sampling is initiated after the leading edge of the $RC(D_i)$ with the shortest latency and during a time m $T_d$. This results in vectors $v_1, v_2, v_3, \ldots, v_l$ with binary elements. The last sample value is omitted in each of these vectors. The number of elements of each vector is therefore equal to the integer part of the ratio $$\frac{mT_d}{T_c}$$

minus one:

$$\text{int}\left(\frac{mT_d}{T_c}\right) - 1$$

One or more data paths corresponding with the camera responses can have the shortest latency and one or more data paths corresponding with the camera response can have the longest end-to-end latency.

Algorithm and Compensation

The vectors $v_i$ of the camera responses are corresponding with data paths corresponding with display images $D_i$.

The vector resulting from the sampling of the $RC(D_i)$ corresponding with the data path with the shortest end-to-end latency can be represented as:

$$\begin{bmatrix} 1 \\ 1 \\ 1 \\ \vdots \\ 1 \\ 1 \end{bmatrix}$$

The camera response from a display with a delay equal to $T_d$ will result in a vector that can be represented as $$\begin{bmatrix} 0 \\ 1 \\ 1 \\ \vdots \\ 1 \\ 1 \end{bmatrix}$$

A camera response from display with a delay equal to 2 $T_d$ will result in a vector represented as $$\begin{bmatrix} 0 \\ 0 \\ 1 \\ \vdots \\ 1 \\ 1 \end{bmatrix}$$

In general a camera response from a display with a delay equal to n $T_d$ will result in a vector with the first n elements equal to zero.

Means is provided to calculate the squared length of each of the vectors $v_i$ with i=1, 2, 3, ... l.

The squared length of a vector $$x = \begin{bmatrix} x_1 \\ x_2 \\ \vdots \\ x_n \end{bmatrix}$$

is calculated and is defined as: $\|x\|^2 = x_1^2 + x_2^2 + \ldots + x_n^2$

We call the "reference vector" $v_{ref}$, the vector corresponding with the data path with the longest end-to-end latency. This reference vector has the shortest length:

$$\min\{\|v_i\|^2, i=1,2,3,\ldots,l\} = \|v_{ref}\|^2 \geq 1$$

The condition $\|v_{ref}\|^2 \leq 1$ must be fulfilled. In case one or more vectors are the zero vector, then the end-to-end latencies are exceeding the time duration of the test pattern. In such cases the time duration of the test pattern must be increased.

For each data path the amount of required compensation is:

$$(\|v_i\|^2 - \|v_{ref}\|^2)T_d \text{ for } i=1,2,3,\ldots l$$

After this compensation each of the data paths will show the same end-to-end latency.

In case $$\min\{\|v_i\|^2, i=1,2,3,\ldots,l\} = 0$$

Then the time duration of the test pattern m $T_d$ must be increased until:

$$\min\{\|v_i\|^2, i=1,2,3,\ldots,l\} \geq 1$$

and the measurement must be restarted.

Figure 15:
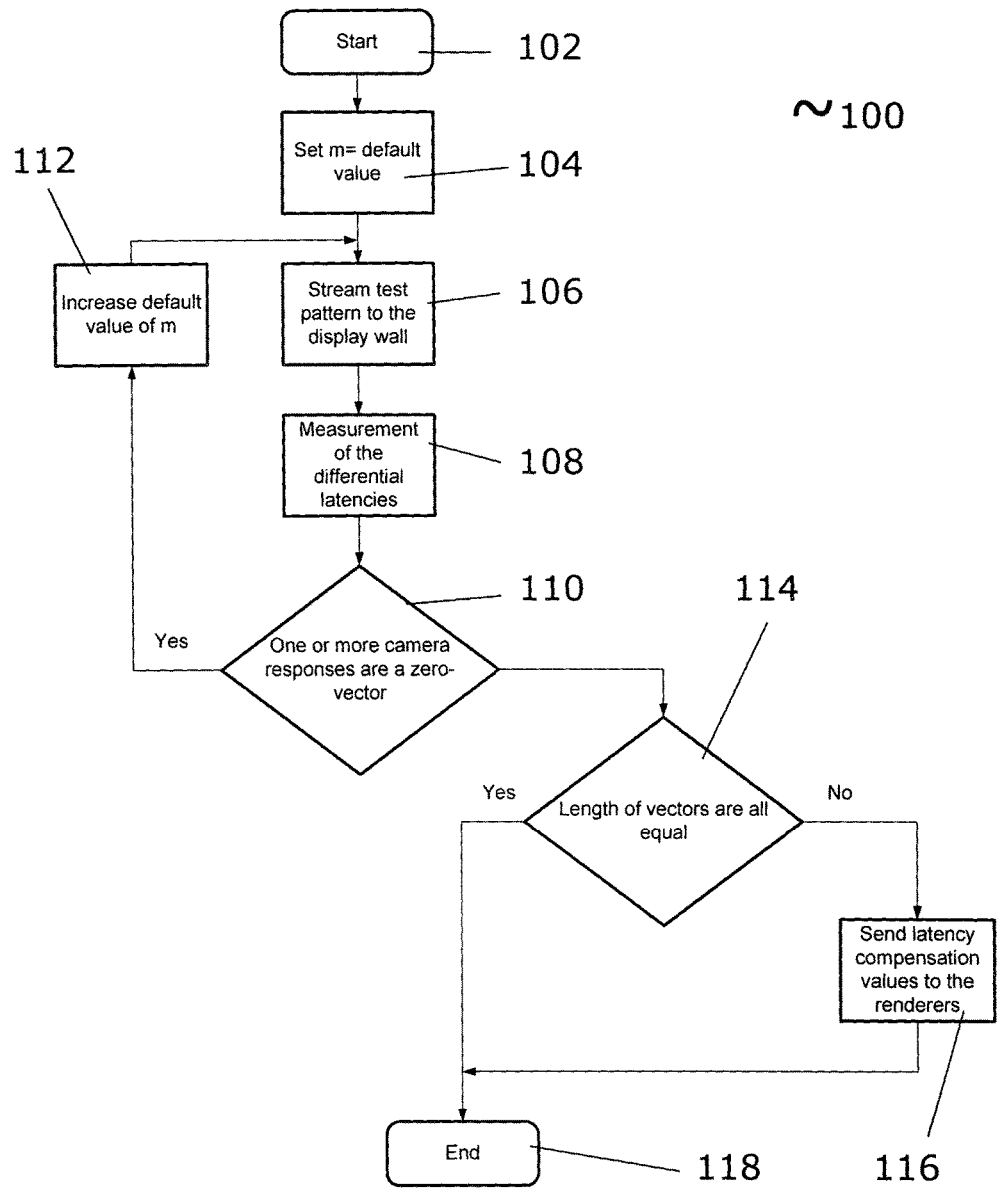
FIG. 15 shows a measurement and delay compensation process and algorithm in accordance with an embodiment of the present invention.
Figure 16:
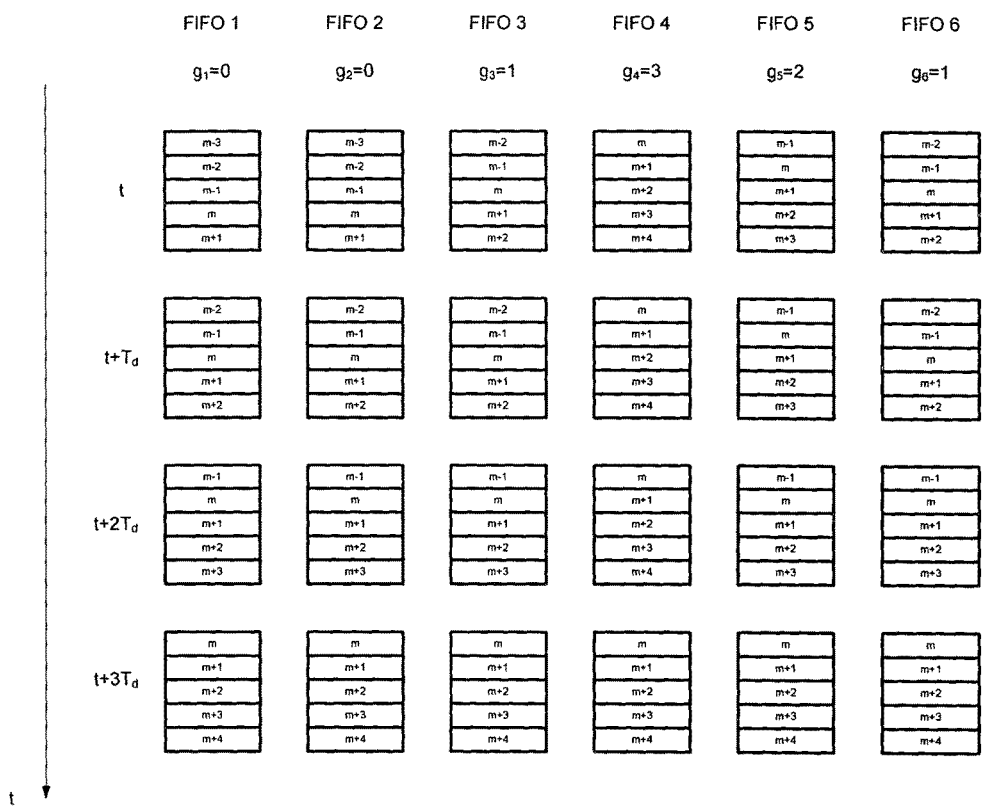
FIG. 16 shows examples of 6 data paths with $g_1=0$, $g_2=0$, $g_3=1$, $g_4=3$, $g_5=2$, $g_6=1$

The complete measurement and compensation process 100 is depicted schematically in FIG. 15. The algorithm starts at step 102. In step 104 a variable m is set to a default value. In step 106 one or more test patterns are streamed and are received at the display unit comprising the displays, the measuring system and the image recording unit (see FIG. 3 for example). The measuring system measures the delay of the displayed images in step 108. In step 110 it is decided if one or more camera responses are zero. If YES it goes to step 112 and the value of m is increased and the algorithm is re-entered before step 106. If NO it is determined in step 114 whether the length of the vectors are all equal. If YES, the process terminates. If No the latency compensation is sent in step 116 to the frame buffer controllers after which the algorithm terminates.

Figure 12:
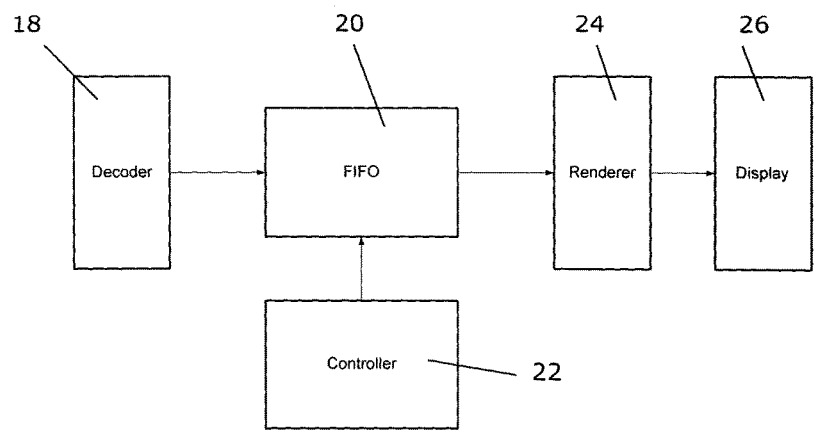
FIG. 12 shows a frame buffer structure in accordance with an embodiment of the present invention with a FIFO with its controller, decoder, renderer and display

The present invention includes in an aspect that compensation can be implemented for the delays. In one embodiment dequeue control of the frame buffer 20 between the decoder 18 and the renderer 24 for each of the data paths is used (see FIG. 12). The frame buffer 20 can be organized as a FIFO (first-in first-out) memory structure see FIG. 12. The frame buffer 20 can store a limited number, for example 5, frames. The decoded frames are enqueued to the FIFO (frame buffer 20) and the dequeued frames are rendered (in 24) and displayed (in 26).

The difference of the end-to-end latency between the slowest data path and any other data path i is:

$(\|v_i\|^2 - \|v_{ref}\|^2)T_d$ for i=1,2,3, . . . l

And let's denote $g_i = (\|v_i\|^2 - \|v_{ref}\|^2)$ for i=1,2,3, . . . l

The measurement system 16 of embodiments of the present invention is preferably adapted to send the amount of latency compensation to each of the controllers 22. This may be provided by a function 17 that may include hardware and/or software. For example each of the controllers 22 is preferably adapted to wait to dequeue its next frame to the renderer 24 during a time $g_i T_d$. The example below shows a the evolution of the frame buffer contents for $g_1=0$, $g_2=0$, $g_3=1$, $g_4=3$, $g_5=2$, $g_6=1$.

It is also important to remark that in case there are also differences in the delays of the renderer and/or display part then this part of the differential delay will also be compensated because the measurement system is measuring the complete end-to-end latency.

Further Embodiment

Figure 13:
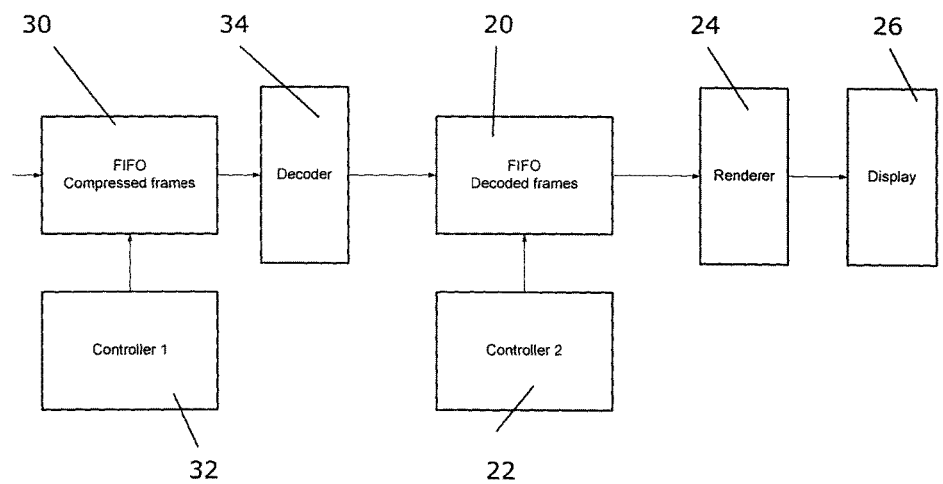
FIG. 13 shows a frame buffer structure in accordance with an embodiment of the present invention with a dequeue-operation in the compressed domain.

Another embodiment of this invention is to delay the dequeue-operations of the streams with latencies lower than the stream(s) corresponding with the reference vector in the frame buffer (FIFO) before the decoding, i.e. in the compressed domain. The compressed frames require less memory space compared with the decoded frames, for example a factor of 20. Therefore, larger frame buffers (FIFOs) occupying less memory space can be realized in the compressed domain. This is a lower cost solution especially in cases where large differential latencies must be compensated. FIG. 13 shows schematically a compressed frame buffer 30 with a decoder 34 and its own controller 32 which feeds the decoder (decompressed) data to the frame buffer 20 with its own controller 22 and from there to be dequeued in the renderer 24 and displayed on the display 26.

Another Embodiment of the Compensation

Another embodiment of the invention is a heterogeneous processing method or system wherein multiple streams are processed within one physical controller and wherein the data within the controller follows different data paths. This is the case when one controller is equipped with for example both a hardware decoder (hardware accelerated decoder based on for example System on Chip (SoC) or programmable hardware) and a software decoder. One stream is then decoded by the hardware decoder 52 (data path 1, FIG. 14) while the other stream is decoded by the software decoder 42 (data path 2, FIG. 14). In practice, the latency of the hardware decoder 52 is often lower than the latency in the software decoder 42.

In general the two streams will require different latency compensations. It is, in this example, possible to do the latency compensation in a similar way as in the previous embodiments at the locations A or D and B or C. Locations A and B are attractive because the size of the frame buffers (FIFOs) for the compressed frames are much smaller compared with the frame buffers (FIFOs) for the decoded frames.

When two or more streams are processed by one physical unit then it is of course necessary to measure the frame latencies of each of these two or more streams processed by one physical unit relative to all the frames of the streams on the other displays of the display wall. These measurements can be done as in the case of a single stream per physical unit but with two or more consecutive measurements or with adapted test patterns where areas on the displays are allocated to each stream.

Figure 14:
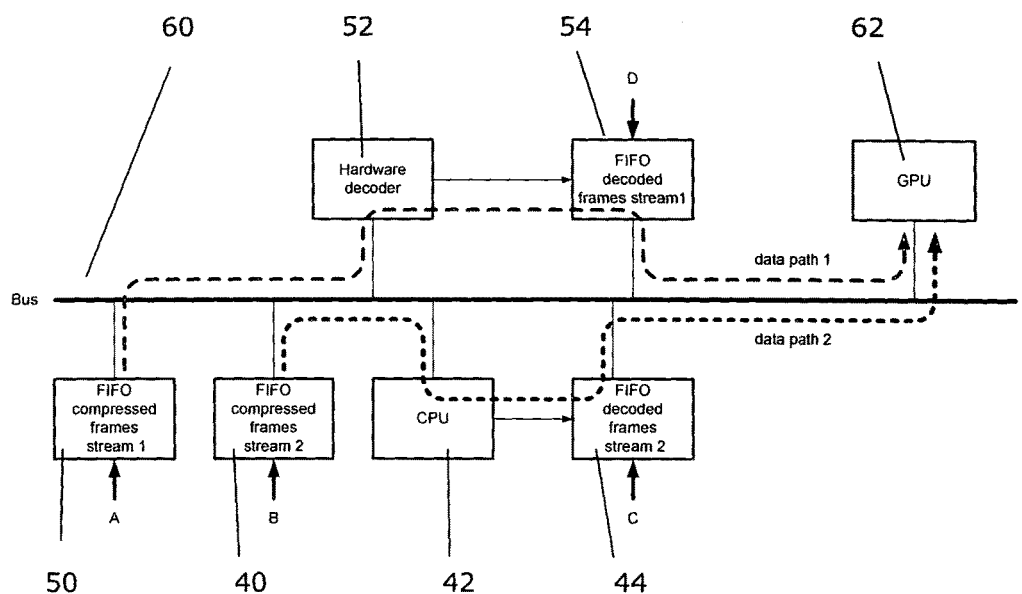
FIG. 14 shows a data path 1 for software decoding and data path 2 for hardware decoding in accordance with an embodiment of the present invention.

In this example one data stream is sent to the hardware decoder 52 and the other stream is sent to the software decoder 42. The hardware and software decoders 52, 42 have in general different latencies, but other elements in the paths of the streams towards the decoders could already have caused additional different latencies for the two streams. There are frame buffers (FIFOs) 50, 54; 40, 44 before and after the decoders 52, 42 respectively. For the hardware decoder 52 this is "FIFO compressed frames stream 1" and "FIFO decoded frames stream 1". For the software decoder 42 this is "FIFO compressed frames stream 2" and "FIFO decoded frames stream 2" (FIG. 14).

It is possible to delay the dequeue-operations of the streams with latencies lower than the stream(s) corresponding with the reference vector at "A" and "D" for stream 1 and at "B" and "C" for stream 2. The decoded frames for both data path 1 and 2 are then sent over the bus 60 to a memory 62 such as a GPU memory from which it is displayed. The frames in the compressed domain require less memory space than the frames in the decoded domain. Therefore larger frame buffers (FIFOs) occupying less memory space can be realized in the compressed domain.

Example $$v_1 \underbrace{\begin{bmatrix} 0 \\ 1 \\ 1 \end{bmatrix}}_{50} \underbrace{\begin{bmatrix} 0 \\ 1 \\ 1 \end{bmatrix}}_{40} \underbrace{\begin{bmatrix} 0 \\ 1 \\ 1 \end{bmatrix}} \underbrace{\begin{bmatrix} 1 \\ 1 \\ 1 \end{bmatrix}}_{42} \underbrace{\begin{bmatrix} 0 \\ 1 \\ 1 \end{bmatrix}} \underbrace{\begin{bmatrix} 0 \\ 1 \\ 1 \end{bmatrix}}_{44}$$

$\|v_1\|^2 = 2$ $\|v_2\|^2 = 2$ $\|v_3\|^2 = 3$ $\|v_4\|^2 = 5$ $\|v_5\|^2 = 4$ $\|v_6\|^2 = 3$ $\min\{\|v_i\|^2, i = 1, 2, 3, 4, 5, 6\} = 2$ for $i = 1$ and 2

For $i = 3$: $\|v_3\|^2 - \|v_1\|^2 =$ $3 - 2 = 1 \Longrightarrow$ data path 3 must be delayed with a factor $(\|v_3\|^2 - \|v_1\|^2)T_d = 1T_d$ For $i = 4$: $\|v_4\|^2 - \|v_1\|^2 =$ -continued $5 - 2 = 3 \Longrightarrow$ data path 4 must be delayed with a factor $(\|v_4\|^2 - \|v_1\|^2)T_d = 3T_d$ For $i = 5$: $\|v_5\|^2 - \|v_1\|^2 =$ $4 - 2 = 2 \Longrightarrow$ data path 5 must be delayed with a factor $(\|v_5\|^2 - \|v_1\|^2)T_d = 2T_d$ For $i = 6$: $\|v_6\|^2 - \|v_1\|^2 =$ $3 - 2 = 1 \Longrightarrow$ data path 6 must be delayed with a factor $(\|v_6\|^2 - \|v_1\|^2)T_d = T_d$ Therefore:

$g_1 = 0, g_2 = 0, g_3 = 1, g_4 = 3, g_5 = 2, g_6 = 1$

The present invention includes within its scope the provision of computer programs to be used with the embodiments. The software may be in the form of a computer program product for execution in a processing engine such as a microprocessor, an FPGA and more generally in a computer based system. The computer program product may be stored on a suitable signal storage means such as an optical disk (for example DVD, CDROM), magnetic disk (for example diskettes, harddrive), solid state memory (for example flash memory, USB stick), magnetic tape or similar. The computer program product may include code segments that are adapted to receive streaming test images over a network when executed in a processing engine such as a microprocessor or FPGA. The computer program product may include code segments that are adapted to provide such images to displays and to provide displaying of the test images on the displays. The computer program product may include code segments that are adapted to capture the displayed images at the different endpoints with an image recording device.

The computer program product may include code segments that are adapted to operate the displays frame locked and having double buffered swap locked memory operation.

The computer program product may include code segments that are adapted to measure delay between the images displayed on the displays.

The computer program product may include code segments that are adapted to measure end-to-end differential latency between displayed images and for putting this in vector form.

The computer program product may include code segments that are adapted to use the vectors to perform differential compensation of the delays at the displays.

The computer program product may include code segments that are adapted to send the vectors are to the displays to steer dequeue operations.

The computer program product may include code segments that are adapted to send the vectors to frame buffers.

The computer program product may include code segments that are adapted to provide delay compensation, e.g. to the rendering units or decoders.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of measurement of differential latency between a plurality of displays located at different endpoints of a network, the displays being driven by one or more rendering machines and being configured to refresh images on different displays at the same point in time so that the content of each displayed image can only change after the completion of the previous displayed frame, the method comprising:

streaming test images from a data source over the network to the plurality of displays at the different endpoints, the data source not being one of the plurality of displays, and displaying the test images on the displays;

capturing the displayed images, at the different endpoints with an image recording device; and measuring end-to-end differential latency between displayed images and for putting in vector form as vectors, wherein the vectors are used to perform differential compensation of the delays at the displays.

2. The method of claim 1 wherein the displays are operated frame locked and have double buffered swap locked memory operation.

3. The method of claim 1 wherein the image recording device is a camera.

4. The method of claim 3 wherein the camera is not synchronized with the displays.

5. The method of claim 1 further comprising measuring delay between the images displayed on the displays.

6. The method of claim 1 wherein the vectors are sent to the displays to steer dequeue operations.

7. The method of claim 1 wherein the vectors are sent to frame buffers.

8. A system of measurement of differential latency between a plurality of displays located at endpoints of network, the displays being driven by one or more rendering machines and being configured to refresh images on different displays at the same point in time so that the content of each displayed image can only change after the completion of previous displayed frame, the system comprising:

a network interface configured to stream test images over the network from a data source to the plurality of displays at the different endpoints, the data source not being one of the plurality of displays;

an image recording device configured to capture displayed images at the different endpoints; and a processor configured to measure end-to-end differential latency between the displays and for putting in vector form as vectors, wherein the processor further configured to use the vectors to perform differential compensation of the delays at the displays.

9. The system of claim 8 wherein the displays are adapted to be frame locked and have double buffered swap locked memory operation.

10. The system of claim 8 wherein the image recording device is a camera.

11. The system of claim 10 wherein the camera is not adapted to be synchronized with the displays.

12. The system of claim 8, further comprising the processor configured to measure a delay between the images displayed on the displays.

13. The system of claim 12, further comprising the processor configured to compensate for the delay between the images displayed on the displays.

14. The system of claim 8 wherein the displays are adapted to use the vectors to steer dequeue operations.

15. The system of claim 8 wherein the vectors are sent to frame buffers.

16. A display unit for measurement of differential latency between displays located at endpoints of network, the display unit comprising:
- a plurality of displays being driven by one or more rendering machines and being configured to refresh images on different displays at the same point in time, so that the content of each displayed image can only change after the completion of previous displayed frame;
- a network interface configured to receive streaming test images from the network and supply these images to the displays at the different endpoints;
- an image recording device configured to capture displayed images at the different endpoints; and
- a processor configured to measure end-to-end differential latency between the displays and for putting in vector form as vectors, wherein the processor further configured to use the vectors to perform differential compensation of the delays at the displays.

17. A computer program product stored on a non-transitory storage medium, the computer product being adapted to:
- measurement of differential latency between a plurality of displays located at different endpoints of a network, the displays being driven by one or more rendering machines and being configured to refresh images on different displays at the same point in time so that the content of each displayed image can only change after the completion of the previous displayed frame;
- stream test images from a data source over the network to the plurality of displays at the different endpoints, the data source not being one of the plurality of displays, display the test images on the displays;
- capture the displayed images, at the different endpoints with an image recording device; and
- measure end-to-end differential latency between displayed images and put in vector form as vectors, wherein the vectors are used to perform differential compensation of the delays at the displays.

* * * * *